United States Patent [19]

Hermening et al.

[11] 4,388,099
[45] Jun. 14, 1983

[54] PRESSURIZED FLUID DISTRIBUTING ARRANGEMENT FOR A FORMING TOOL FOR SHAPING THERMOPLASTIC MATERIAL

[75] Inventors: Helmut Hermening, Petershagen; Norbert Monden, Auetal; Lothar Schaar, Heuerssen; Wilhelm Schneider, Auetal; Hans-Georg Seidel, Rinteln, all of Fed. Rep. of Germany

[73] Assignee: Hermann Heye, Obernkirchen, Fed. Rep. of Germany

[21] Appl. No.: 312,851

[22] Filed: Oct. 19, 1981

[30] Foreign Application Priority Data

Oct. 25, 1980 [DE] Fed. Rep. of Germany ....... 3040310

[51] Int. Cl.³ .............................................. C03B 9/38
[52] U.S. Cl. ....................................... 65/267; 65/319; 65/356; 65/357
[58] Field of Search .................. 65/356, 319, 267, 357

[56] References Cited

U.S. PATENT DOCUMENTS

| | | | |
|---|---|---|---|
| 3,617,232 | 11/1971 | Goodwin | 65/267 |
| 3,653,870 | 4/1972 | Foster et al. | 65/356 |
| 4,140,046 | 8/1978 | McCreery | 65/356 X |
| 4,142,884 | 3/1979 | Jones | 65/356 |
| 4,251,253 | 2/1981 | Heye | 65/267 |

Primary Examiner—Robert L. Lindsay, Jr.
Attorney, Agent, or Firm—Michael J. Striker

[57] ABSTRACT

A distributing arrangement for a pressurized cooling fluid, especially air, for cooling a forming tool of a machine for forming thermoplastic material, especially molten glass, wherein the forming tool includes at least one split mold including mold segments which are respectively mounted on mold segment holders for movement therewith relative to one another and each of which is provided with a plurality of fluid channels for the flow of the pressurized of fluid channels for the flow of the pressurized cooling fluid therethrough, comprises a fluid distributing box including for each of the mold segments at least two branch channels individually communicating with at least one of the fluid channels when the distributing box is mounted on the mold segment holder. The branch conduits can either directly communicate with the fluid channels across an interface formed by juxtaposed connecting and opposing surfaces of the distributing box and the associated mold segment, or a connecting box including a plurality of connecting channels may be interposed between the distributing box and the respective mold segment, in which case the interface is provided between the distributing and connecting boxes. The connection at the interface is established by merely resting the connecting surface on the opposing surface which has a complementary configuration to the connecting surface.

14 Claims, 12 Drawing Figures

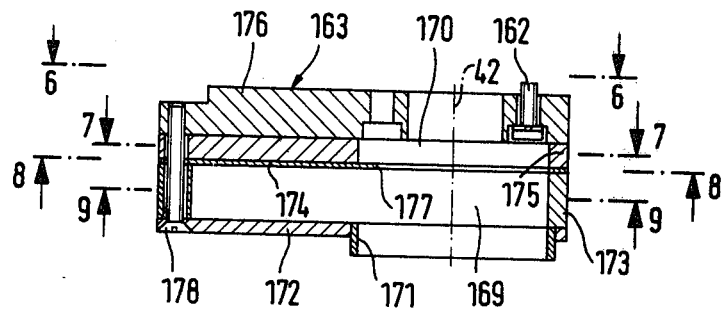
Fig. 5
Fig. 8
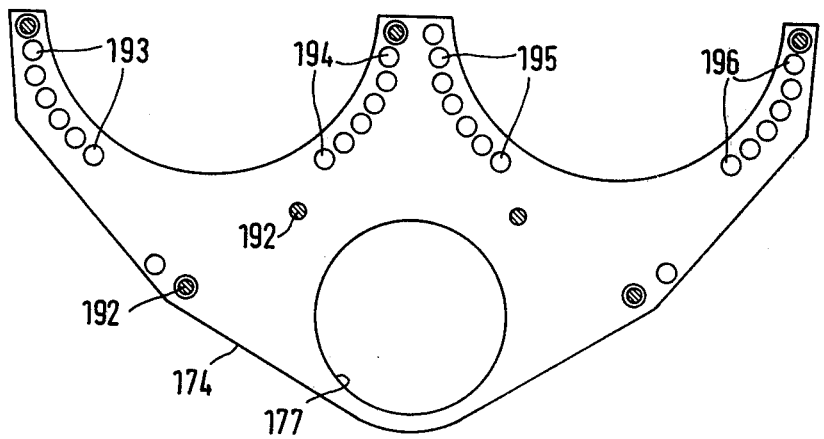

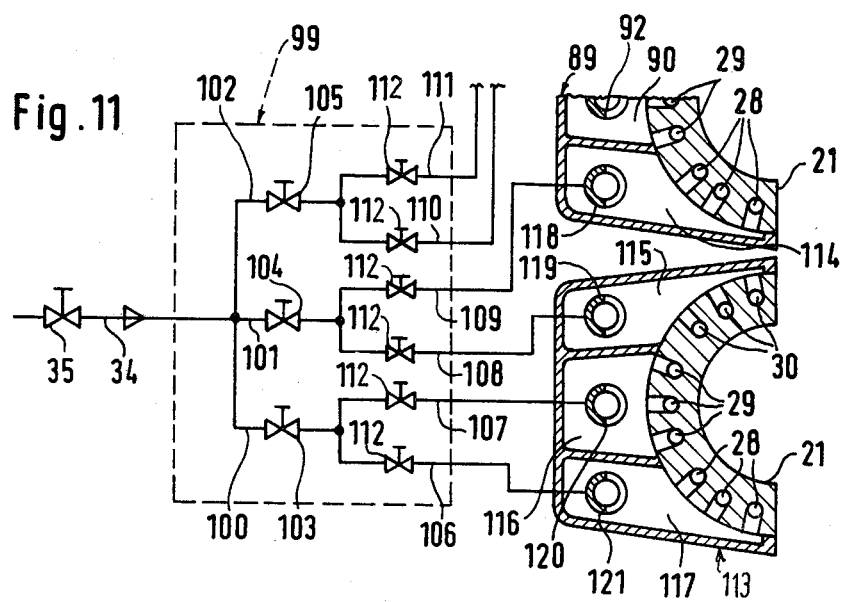

PRESSURIZED FLUID DISTRIBUTING ARRANGEMENT FOR A FORMING TOOL FOR SHAPING THERMOPLASTIC MATERIAL

BACKGROUND OF THE INVENTION

The present invention relates to fluid distributing arrangements in general, and more particularly to a distributing arrangement usable in a machine for shaping thermoplastic material, especially molten glass, for cooling the forming tool.

There are already known various constructions of machines constructed for producing articles from thermoplastic materials, among them such which are especially suited for making hollow glass articles, such as bottles or the like. One construction of the machine of the last-mentioned kind includes a forming tool which includes at least one split mold the mold segments of which are respectively carried by associated mold segment holders and are movable relative to one another. This construction further includes fluid distributing means or device which is movable with the respective mold segment holder and which is in communication with a fluid supply source, such as a source of pressurized air. The fluid distributing device includes a plurality of outlet openings which communicate through an interface with associated inlet openings of fluid channels provided in the respective forming tool, there being provided means for detachably connecting the fluid distributing device to the respective mold segment in a screw-free manner.

More particularly, an arrangement of this type is revealed in the British Pat. No. 1,377,292. In this conventional construction, which includes a triple mold, the fluid distributing means which is constructed as distributing pipes are respectively mounted on the mold segment holder which is constructed as a pivotable tong half. Each of the distributing pipes has only one outlet opening for each of the mold segments, and the connecting means which connects the respective outlet opening with the associated inlet opening of the respective mold segment is constructed as a nipple partially received in the respective outlet opening, urged out of the same by a compression spring, and movable therein by the associated mold segment. In the operative condition, the nipple is received in an inlet opening which is common to all of the fluid channels of the respective mold segment approximately in the middle of the respective mold segment. Cooling air is supplied to the distributing pipe by a supply conduit which is attached to the respective tong half. This known construction requires the availability of a considerable amount of lateral space and is limited to the admission of the cooling air into only one inlet opening which is situated approximately in the middle of the respective mold segment. As a result of this, a differentiated admission of the cooling fluid into the respective fluid channels of the mold segments is impossible to achieve in this construction.

It is known from a commonly owned U.S. Pat. No. 4,251,253 to so construct the cooling arrangement that the fluid channels of each of the mold segments are arranged respectively in a plane which extends through a longitudinal axis of the associated mold recess, and that it is possible to admit the cooling fluid into the fluid channel and/or one or more groups of fluid channels independently of one another in a controlled or regulated manner. To achieve this, various fluid supply elements which communicate with the inlet openings of the fluid channels are threadedly connected with the mold segment. Even though this construction renders it possible to achieve a differentiated supply for the cooling fluid to the fluid channels of each of the mold segments, the mounting and dismounting of the supply elements during the mounting and exchange of the molds is very cumbersome and time-consuming. In addition thereto, only a limited amount of space is available at the region of the molds in certain machines, so that the mounting of such conventional supply elements on the mold segments is rendered very difficult, if not impossible.

It is known from the U.S. Pat. No. 4,142,884 to feed the cooling fluid into the respective fluid channel through an associated branch channel from a distributing channel which is associated with each mold segment of each half of the forming tool. The distributing channels are respectively connected via an associated parting channel with a common supply nipple which is connected to a supply source. What is disadvantageous in this construction is that, for both of the mold segments of each half of the forming tool, all fluid channels, all branch channels, the two distributing channels and the supply nipple are rigidly connected with one another and with the respective mold segments and that they require the presence of a substantial amount of space upwardly of the mold segments. During the periodical exchange of the mold segments, which is necessitated either by the wear thereof or in order to be able to switch from the production of one type of articles to another, all of the new mold segments must be equipped with the pressurized fluid distributing device upto and including the supply nipple, which is very expensive and results in a very bulky construction. Thus, it is disadvantageous that the assembly and storage of the mold segments of this construction are very difficult.

SUMMARY OF THE INVENTION

Accordingly, it is a general object of the present invention to avoid the disadvantages of the prior art.

More particularly, it is an object of the invention to provide a fluid distributing arrangement for use especially in machines capable of shaping thermoplastic material, particularly molten glass, which is not possessed of the disadvantages of the conventional arrangements of this type.

Still another object of the present invention is to so construct the distributing arrangement of the type here under consideration as to be able to individually control the flow of the cooling fluid into and through the fluid channels of the respective mold segments.

It is yet another object of the invention to so design the distributing arrangement as to be adaptable to mold segments of different types and to render it possible to exchange or mount the mold segments in a very simple manner.

A concomitant object of the present invention is to develop a distributing arrangement for use in cooling mold segments which is simple in construction, easy to manufacture, assemble and mount, and reliable in operation nevertheless.

In pursuance of these objects and others which will become apparent hereafter, one feature of the present invention resides in a distributing arrangement for a pressurized fluid, especially air, for cooling a forming tool of a machine for forming thermoplastic material, especially molten glass, wherein the forming tool includes at least one split mold including mold segments which are respectively mounted on mold segment holders for movement therewith relative to each other and each of which is provided with a plurality of fluid channels for the flow of the pressurized cooling fluid therethrough, which arrangement comprises, briefly stated, a fluid distributing box mounted on each of the mold segment holders for movement therewith and including for each of the mold segments at least two branch channels respectively individually communicating with at least one of the fluid channels of the respective mold segment; means for forming a dismountable screw-free interface between the fluid channels of the respective mold segment and the branch channels of the fluid distributing box; and means for supplying the pressurized cooling fluid into the fluid distributing box. Advantageously, the fluid distributing box is detachably mounted on the respective mold segment holder.

Inasmuch as each of the branch channels supplies the pressurized cooling fluid into only some of the fluid channels of the associated mold segment, it can be so spatially arranged as to use the space available in the machine in the best possible manner. The cross-sectional configuration of the branch conduits can be optimized in order to obtain the desired fluid flow conditions of the pressurized cooling fluid in the fluid channels. The mass of the mold segments can be kept to a minimum. There are obtained very short mold exchange time periods. During the exchange of the mold segments, the fluid distributing box remains in position on the mold segment holder. Moreover, when the previous mold segment is replaced by a new mold segment of the same type, the adjustment of the throttling valves, which may be provided upstream of the interface, can be maintained.

A very advantageous construction is obtained when, in accordance with a further facet of the present invention, the fluid distributing box further includes at least one distributing channel arranged upstream of the branch channels and communicating with the upstream ends of at least two of such branch channels. The provision of such distributing channels is advantageous inasmuch as it renders it possible to utilize the space conditions in the machine to the best advantage. Furthermore, the distributing channels also lend themselves to use in achieving special flow conditions in the fluid channels and simplifying the differentiated supply of the pressurized cooling fluid into the latter.

A throttling valve may be arranged, in accordance with a further advantageous concept of the present invention, in a supply conduit which forms a part of the supplying means and communicates with the distributing channels and/or in each of the distributing channels and/or in each of the branch channels. When this expedient is resorted to, the pressure of the pressurized fluid in the fluid channels can be adjusted between 0 and 100%. The position of the throttling valve can be adjusted either manually or by means of a motor, and in the latter instance, the adjustment can be controlled or regulated in accordance with the conditions encountered in the forming tool.

It is particularly advantageous in a situation where the mold segment holder includes a holder arm movable in the opening and closing directions of the forming tool, and a tilting member tiltably mounted on the holder arm and adapted to support at least two of said mold segments of a multiple mold, when the fluid distributing box is mounted on the holder arm for movement therewith. This is advantageous in that the tilting member or the tilting bolt which mounts the tilting member on the holder arm is not subjected to the effects of the weight of any additional elements.

A particularly advantageous construction is obtained when the means for forming the interface includes a connecting surface on each of the mold segments onto which the fluid channels open, and an opposing surface on the fluid distributing box juxtaposed with the connecting surface and onto which the branch channels open in alignment with the fluid channels of the mold segment. This construction provides for an especially simple and direct connection of the fluid distributing box with the inlet openings of the fluid channels. A special pressing of the cooperating surfaces against one another need not be provided in order to obtain sufficient sealing action since, on the one hand, a cooling fluid, for instance, cooling air, is being usually used which has a relatively low blowing pressure in the order of magnitude of $50 \cdot 10^2$ Pascal in the field of hollow glass article manufacture and, on the other hand, the mold segment, owing to its own weight, establishes a sufficient sealing contact at the connecting zone. Another advantage of this construction is that the exchange of the mold segments is especially simple. Furthermore, relative movements in the transverse direction between the mold segment and the mold segment holder can be compensated for at the interface without any need for any additional measures. Such transverse movements occur during the operation because of the suspension of the mold segments on the mold segment holders, which is usually accomplished with a certain amount of play.

Another advantageous facet of the present invention which results in a space-saving overall structure and in a controllable admission of the pressurized cooling fluid into the fluid channels is obtained when the fluid distributing box includes a plurality of chambers separated from one another and arranged along mutually parallel planes upstream of and communicating with at least two of the branch channels each to constitute respective distributing channels for the associated ones of the branch channels. The distributing channels which have the configurations of chambers have for their consequence a quieting of the flow, so that a dynamic component, which would deleteriously affect the uniformity of flow of the pressurized fluid into and through the fluid channels, is eliminated or at least significantly reduced.

It was established to be advantageous, especially in comparison with the construction according to the aforementioned U.S. Pat. No. 4,251,253, for use with a forming tool constructed as a double mold, when the fluid distributing box is associated with both of the mold segments of the double mold carried by the same mold segment holder, when a first of the distributing channels communicates with two of the branch channels which, in turn, respectively communicate with the fluid channels in a central circumferential region of each of the mold segments, and when a second of the distributing channels communicates with further three of the branch channels which, in turn, respectively communicate with groups of the fluid channels at the remaining circumferential regions of the mold segments. In this manner, the temperature profile at the surface of the respective mold segment which comes into contact with the thermoplastic material can be set and maintained with the required degree of precision.

According to an additional advantageous facet of the present invention, the means for forming the interface includes a connecting box mounted on the respective mold segment and having a plurality of connecting channels communicating each of the branch conduits with at least one of the fluid conduits. This construction provides for a simple admission of the pressurized cooling fluid into the fluid channels even when a direct connection of the fluid channels to the outlet openings of the branch channels is impossible for structural reasons. When throttling valves are provided, they are advantageously arranged upstream of the interface, in order to assure that, once an optimum setting of the throttling valves is found, it can be maintained even after the mold segment replacement. In this respect, it is especially advantageous when the interface is formed between the connecting box and the fluid distributing box.

Another advantageous feature of the present invention resides in that the means for forming the interface further includes a connecting body which is movably mounted on the connecting box and which forms a hollow space constituting the beginning of the associated connecting channel, the connecting body having a free edge zone forming a connecting surface, an opposing surface being formed on the fluid distributing box, the opposing surface being complementary to the connecting surface and surrounding the downstream end of the associated branch channel, the connecting surface resting on the opposing surface. The connecting body of this construction constitutes a connecting element which is reliable in operation and which requires only a minimum amount of, if any, maintenance. In the alternative, the situation may be reversed, that is, the connecting body may be mounted on the fluid distributing box and its connecting surface provided on the free edge portion thereof may be in contact with a complementary opposing surface of the connecting box which surrounds the inlet opening of the associated connecting channel.

A sufficient pressing action between the connecting and opposing surfaces to assure sufficient sealing effect at the connecting zone can be assured when, in accordance with a further development of the present invention, a loading member of a selectable weight is provided, which rests on the connecting body. However, instead of the loading member, there may also be provided a compression spring arranged between the connecting body and either the fluid distributing box or the connecting box, depending on which of these boxes carries the connecting body.

The novel features which are considered as characteristic of the invention are set forth in particular in the appended claims. The improved machine itself, however, both as to its construction and its mode of operation, and particularly the distributing arrangement used therein, together with additional features and advantages thereof, will be best understood upon perusal of the following detailed description of certain specific embodiments with reference to the accompanying drawing.

BRIEF DESCRIPTION OF THE DRAWING

FIG. 2A is a top plan view taken along the line 2A—2A of FIG. 2 at a reduced scale;

FIG. 5 is another longitudinal sectional view of the modified construction of FIG. 4 taken on line 5—5 of FIG. 6;

FIG. 8 is a sectional view taken along the line 8—8 of FIG. 5;

FIG. 11 is a circuit diagram of a further modified construction.

DETAILED DESCRIPTION OF THE PREFERRED EMBODIMENTS

Figure 1:
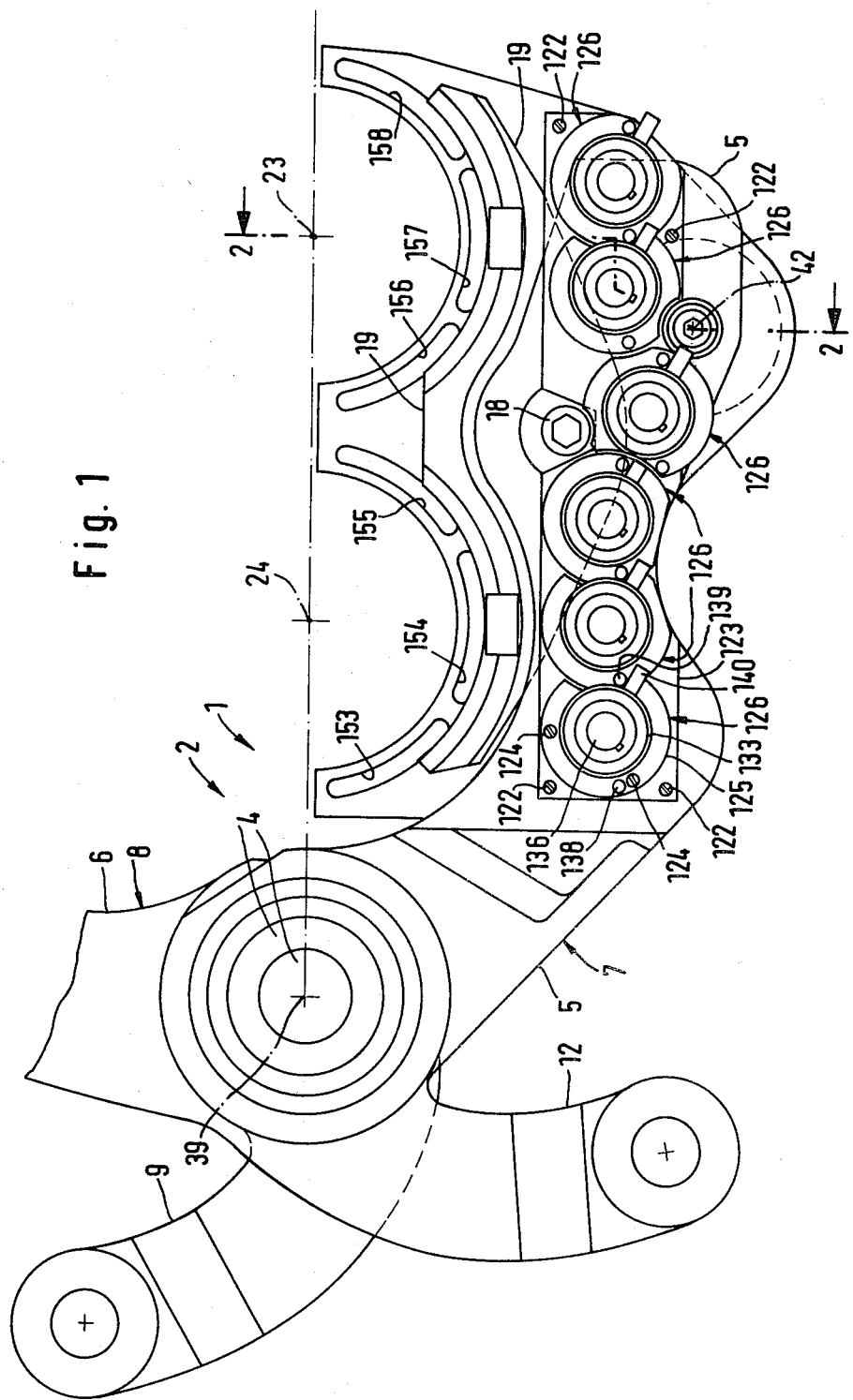
FIG. 1 is a top plan view of a part of a glass-forming machine including a fluid distributing box according to the invention mounted on a holder arm.

Referring now to the drawing in detail, and first to FIG. 1 thereof, it may be seen that the reference numeral 1 has been used therein to identify a pre-forming part of a station 2 of a so-called I.S. glass forming machine. Glass gobs supplied from a gob feeder, which has been omitted from the drawing in order not to unnecessarily encumber the same, in their molten or viscous state, are formed in the station 2 into hollow glass articles in a pressing and blowing operation.

Figure 2:
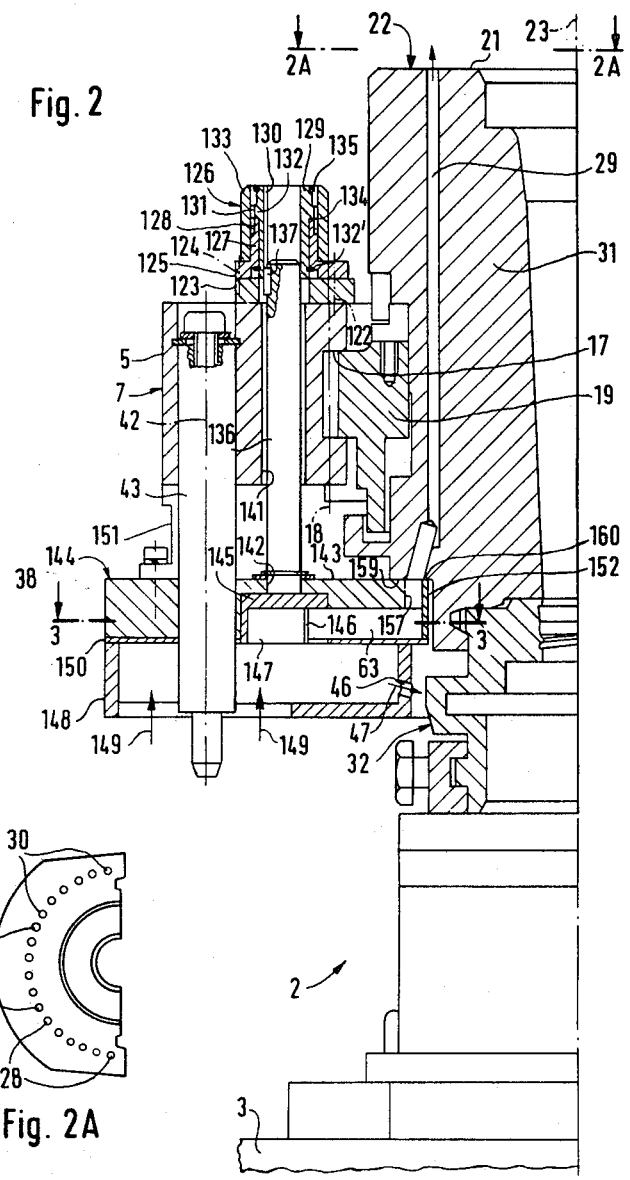
FIG. 2 is a sectional view taken along the line 2—2 of FIG. 1.

The station 2 has a machine frame 3 which can be seen in FIG. 2. An upright hinge column 4 is rigidly connected with the machine frame 3, and tong-shaped holding arms 5 and 6 of mold segment holders 7 and 8 are pivotably mounted thereon. The mold segment holder 7 is shown in FIG. 1 in its closed position, and the mold segment holder 8 in its fully open position. A rearward arm 9 is secured to the holding arm 5, and it is connected, in a manner which is well known and thus has not been illustrated in the drawing, by means of a bolt to a lug. In a similar manner, a rearward arm 12 extends from the holding arm 6, and it is again connected by means of a bolt to a lug. The aforementioned lugs are respectively pivotally connected to associated crank pins of a crank that is attached to a driving shaft, for the holding arms 5 and 6 to be moved in dependence on the rotation of the driving shaft, as is well known in this type of machine.

The holding arm 5 has a lateral recess 17, which is best seen in FIG. 2, and a tilting member 19 is tiltably mounted in this recess 17 by means of a tilting bolt 18. The same is applicable to the holding arm 6 as well, so that the following description applies to both holding arms 5 and 6 and the associated components, the only difference being that the arms 5 and 6 and the associated components are configurated and arranged in a mirror-symmetrical manner with respect to one another.

Two identical mold segments 21, which are configurated as pre-forming mold halves, can be suspended on the tilting member 19 in a conventional manner, as illustrated in FIG. 2. The mold segments 21 constitute components of a forming tool 22 which, in the illustrated construction, is constructed as a double mold.

Each of the mold segments 21 is provided with three groups of fluid channels 28 to 30 which may best be seen in FIG. 2A. The fluid channels of each of the groups are arranged in succession along a circular arc centered on the respective longitudinal axis 23 or 24 of the mold segments 21. As may be seen particularly in FIG. 2, the fluid channels 28 to 30 are provided in a wall 31 of the respective mold segments 21 and are fully situated in a plane passing through the longitudinal axis 23, 24.

A neck ring 32 of a split construction is associated with each of the mold segments 21, as may also be seen in FIG. 2. The segments of the neck ring 32 are mounted at the station 2 in a conventional manner for movement independently of the mold segment holders 7 and 8. In the closed position shown in FIG. 2, lower regions of the mold segments 21 overlap upper regions of the closed neck rings 32. Pressing plungers, which have also been omitted from the drawing, penetrate in a well-known manner from below centrally through the neck rings 32 into the interior of the then closed mold segments 21 and deform a glass gob which has previously been introduced into the forming tool 22 into a parison.

Figure 4:
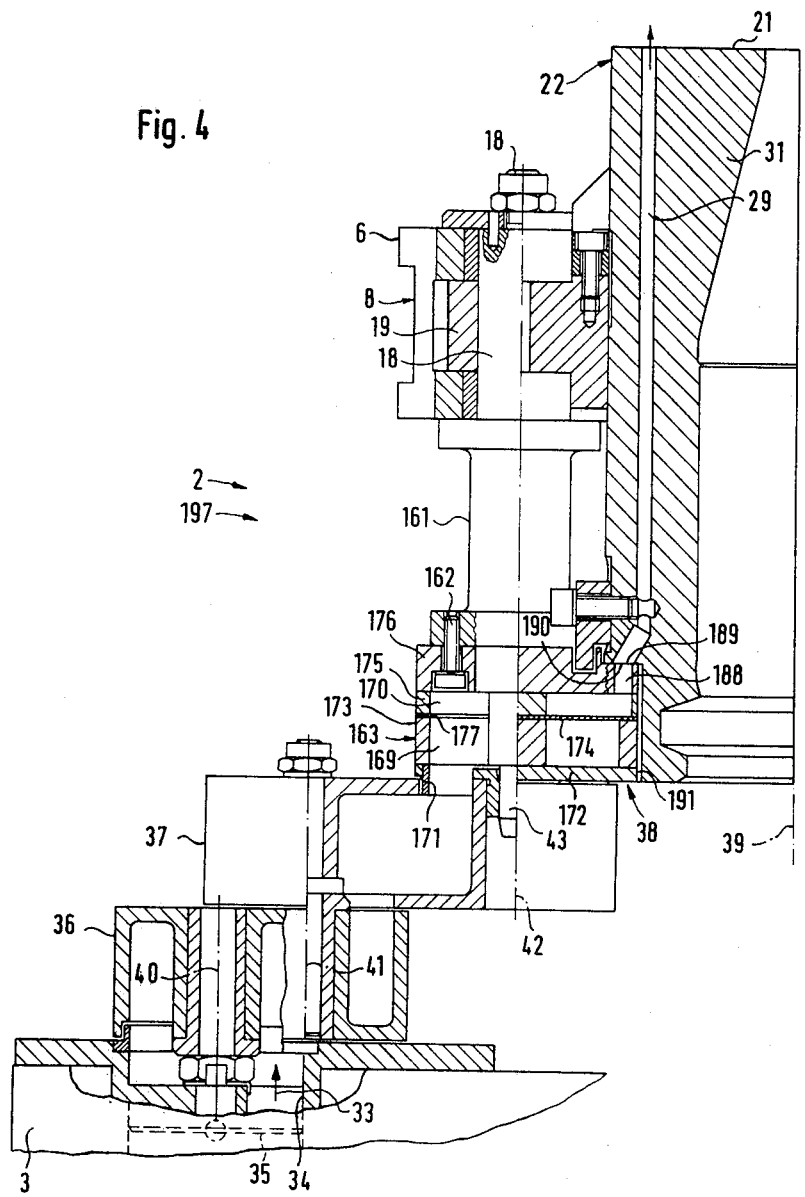
FIG. 4 is a longitudinal sectional view of a part of a modified construction in which the fluid distributing box is mounted on a tilting bolt.
Figure 6:
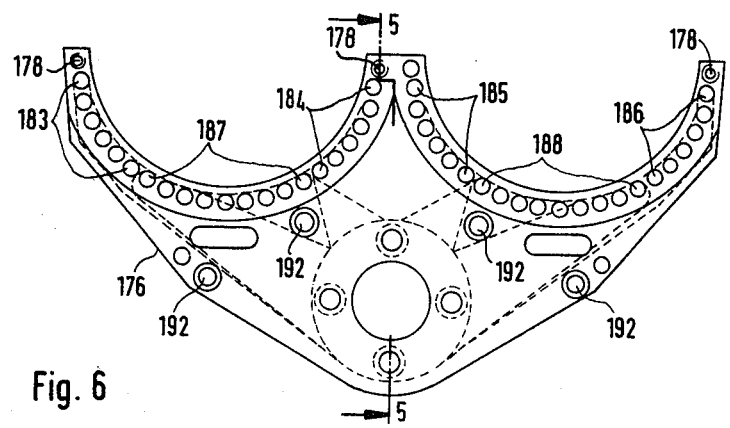
FIG. 6 is a top plan view taken along the line 6—6 of FIG. 5.

A supply of pressurized fluid, such as air, intended to serve as a cooling medium is made available in a non-illustrated hollow space of the machine frame 3, in a well-known manner. This pressurized fluid flows in the direction of an arrow 33, as shown in FIG. 4, through a supply conduit of the machine frame 3. A throttling valve 35 can be provided in a conventional manner in the supply conduit 34. The throttling valve 35 can be controlled or regulated as to its position between two terminal positions in one of which it fully establishes, and in the other of which it fully interrupts, the communication through the supply conduit 34 for the flow of the pressurized fluid therethrough. As the pressurized fluid emerges from the supply conduit 34, it enters a first articulated conduit component 36, then it flows from the first articulated conduit component 36 into a second articulated conduit component 37 to finally emerge from the second articulated conduit component 37 and enter a fluid distributing device 38 which will be described in more detail later.

The hinge column 4 constitutes a first pivoting axle 39. A second pivoting axle 40, about which the first articulated conduit component 36 is pivotable relative to the machine frame 3 while a constantly uninterrupted transfer of the pressurized fluid from the supply conduit thereinto is assured, extends in parallelism with the first pivoting axle 39. The second articulated conduit component 37 is pivotable relative to the first articulated conduit component 36 about a third pivoting axle 41, and relative to the fluid distributing device 38 about a fourth pivoting axle 42 which is also illustrated in FIG. 2. All of the pivoting axles 39 to 42 extend parallel to one another and at a distance from each other.

The articulated conduit components 36 and 37 are entrained for joint movement or pivoting by a driving bolt or pin 43 which is shown in FIG. 2, the driving bolt 43 being secured to the holding arm 5. The mold segment holder 8 is provided with a fluid distributing device similar to the fluid distributing device 38, and with articulated conduit components similar to the articulated conduit components 36 and 37, in a mirror-symmetrical manner, so that the description of one of these arrangements is sufficient for understanding the construction and operation of the other.

In the construction depicted in FIGS. 1 to 9, the pressurized fluid is fed at the lower end of each of the mold segments 21. The region at which the cooling fluid is preferably introduced into the mold segment 21 depends on the location of the region of highest heat transfer in the wall 31 of the mold segment 21. It will always be desirable to introduce the cooling fluid into the region of the mold segment 21 where the heat transfer or heat contents is the highest.

As shown in FIG. 1, an elongated mounting plate 123 is connected to the holding arm 5 at the upper surface of the latter by means of screws 122. Arresting parts 125 of six arresting elements 126 are connected to the upper part of the mounting plate 123 by means of screws 124. Arresting elements 126 of this type are marketed, for instance, by the Otto Ganter Normteile Fabrik in Furtwangen, Federal Republic of Germany.

According to FIG. 2, each of the arresting parts 125 carries an outer toothed formation 128 at the upper portion of an upwardly extending sleeve 127. A setting sleeve 129 is turnably accommodated in the interior of the sleeve 127. The setting sleeve is provided in its interior with a hub keyway 130 extending over its entire length and at its upper end with an outer toothed formation 131 formed on a collar 132. The outer toothed formations 128 and 131 have the same tooth distribution and extend along pitch circles which are aligned with one another. The collar 132 rests from above on the sleeve 127. The setting sleeve 129 is held in position in the axial direction by a securing ring 132' which abuts against a shoulder of the arresting part 125. An adjusting sleeve 133 is turnably supported on the external surface of the sleeve 127. The adjusting sleeve 133 is provided with an inner toothed formation 134 having the same pitch as the outer toothed formations 128 and 131. The inner toothed formation 134 permanently engages the outer toothed formation 131 of the setting sleeve 129 and can be selectively brought into engagement with the outer toothed formation 128 of the sleeve 127. In order to achieve this selective engagement, the adjusting sleeve 133 can be shifted upwardly relative to the setting sleeve 129. A safety ring 135 forms an abutment delimiting the extent of the axial shifting of the inner toothed formation 134. In this lifted position of the adjusting sleeve 133, the latter can be turned jointly with the setting sleeve 129, because of the then existing engagement of the toothed formations 134 and 131 with one another. During this rotation, a shaft 136 is entrained by means of a spring 137 for joint movement. Once the desired new position of the shaft 136 is achieved, the adjusting sleeve 133, and with it also the inner toothed formation 134, are shifted in the downward direction until there is reestablished an engagement of the inner toothed formation 134 of the adjusting sleeve 133 with the outer toothed formation 128 of the sleeve 127, that is, into the position apparent in FIG. 2. The turning movement of the shaft 136 is limited, in each instance, by two abutment pins 138 and 139 which extend upwardly from the arresting part 125, and by a limiting pin 140 of the adjusting sleeve 133 which cooperates with the abutment pins 138 and 139, respectively.

Each shaft 131 passes through a bore 141 of the holding arm 5 and through a bore 142 which is coaxial therewith and is provided in a top wall 143 of a fluid distributing box 144 of the fluid distributing device 38. The shaft 136 carries at its lower end a cup-shaped throttling valve 145 having a lateral opening 146. The throttling valve 145 is fitted into a receiving opening of the fluid distributing box 144 and has an inlet opening 147 which is in permanent communication with the internal space of a collecting box 148, into which the pressurized fluid is introduced in the direction of an arrow 149 from the second articulated conduit component 37 which has been shown only in FIG. 4. The pressurized fluid freely flows from the interior of the collecting box 148 into a jet arrangement 46 which directs the flow of the pressurized fluid in the direction of an arrow 47 against the neck rings 32. A metallic sealing plate 150 is arranged between the collecting box 148 and the fluid distributing box 144. The collecting box 148, the sealing plate 150, and the fluid distributing box 144 are connected to one another by means of non-illustrated screws to form a unit which constitutes the fluid distributing device 38. As may be seen in FIG. 2, this unit of fluid distributing device 38 is connected, on its part, with a lower region of the holding arm 5, such as by a threaded connection. Under normal circumstances, a radial gap 152 is present between the unit 38 and the mold segment 21, this gap 152 permitting limited relative movements in the radial direction.

Figure 3:
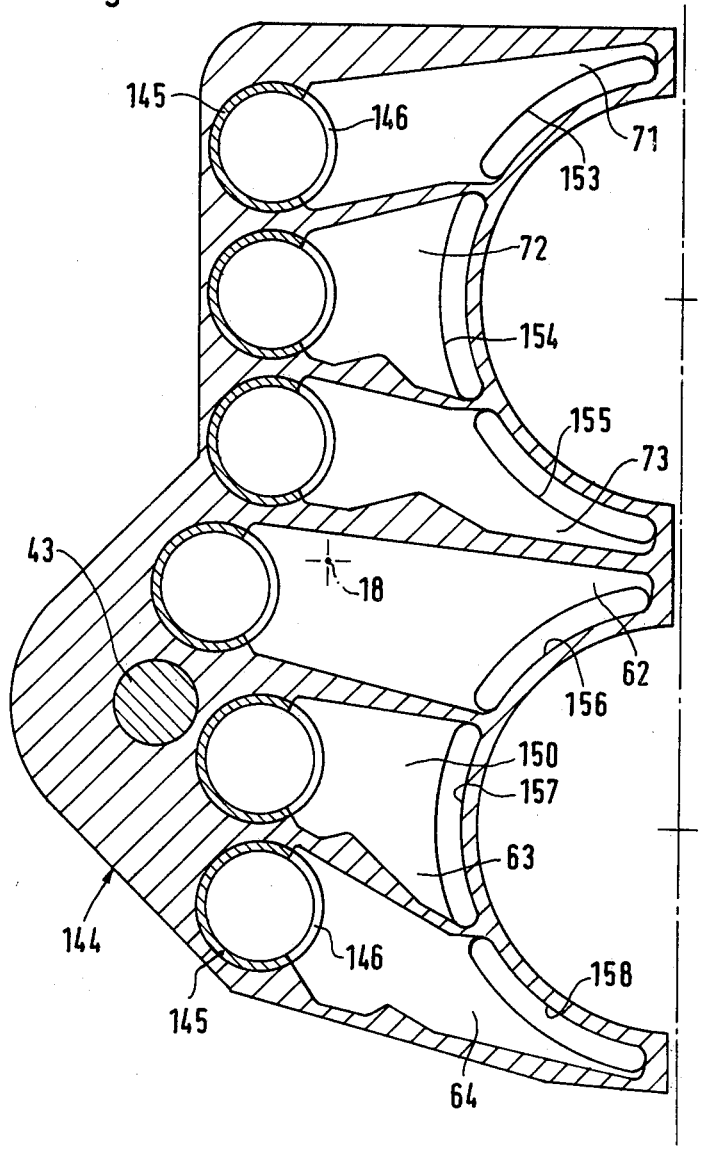
FIG. 3 is a sectional view taken along the line 3—3 of FIG. 2.

The fluid distributing box 144 includes branch channels 62 to 64 and 71 to 73 which may be seen in FIG. 3. Each branch channel, for instance, 63 is provided with an arcuate slot shaped outlet opening 153 to 158 in the top wall 143 of the fluid distributing box 144. The outlet openings 153 to 158 open onto an opposing surface 160 of the fluid distributing box 144 which is complementary to a connecting surface 159 of the mold segment 21. The connecting surface 159 is formed with inlet openings of the fluid channels 28 to 30, which may be seen in FIG. 2A, such inlet openings being in alignment with the outlet openings 153 to 158. The connecting surface 159 of the mold segment 21 merely rests on the opposing surface 160 of the fluid distributing box 144. Thus, an interface exists between the opposing surface 160 and the connecting surface 159 for a disassemblable, screw-free connection of the mold segments 21 with the pressurized fluid distributing device 38. Consequently, it is very easy to accomplish the replacement of the mold segments 21 by different mold segments, and this operation is also very quick. At the same time, the throttling setting of the throttling valves 145 can be maintained, so long as no new mold segment type is substituted for the old mold segment type, which is very advantageous and expedites the retooling operation. No additional sealing elements are needed at the interface for preventing leakage of the pressurized fluid.

FIG. 3 shows further details of the fluid distibuting box 144, and especially a section through the branch channels 62 to 64 and 71 to 73.

FIG. 4 shows a modified construction of the distributing device for a finish forming part 197 of the station 2, wherein the mold segments are constituted by finishing mold segments. The same or corresponding parts or components are identified in the following description by the same reference numerals as used above in connection with the description of FIGS. 1 to 3. The tilting bolt 18 is extended herein in the downward direction by an extension member 161, and the driving bolt 43 for the pivoting movement of the articulated conduit components 36 and 37 adjoins the extension member 161 downwardly of the latter and coaxially therewith. As shown here, the tilting bolt 18, the extension member 161, and the driving bolt 43 are made of one piece with one another.

Figure 9:
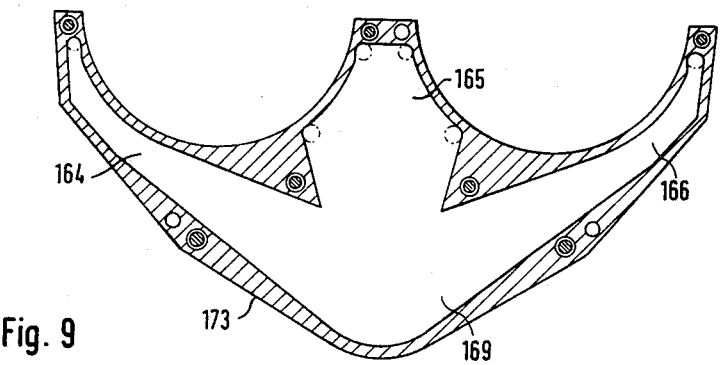
FIG. 9 is a sectional view taken along the line 9—9 of FIG. 5.
Figure 7:
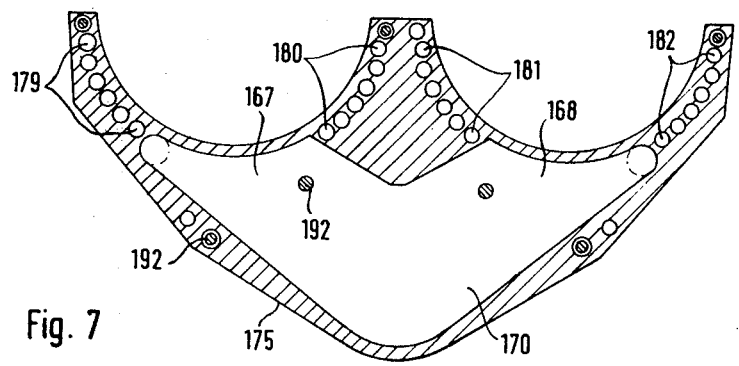
FIG. 7 is a sectional view taken along the line 7—7 of FIG. 5.

A fluid distributing box 163 is connected underneath the extension member 161 by means of screws 162. As shown in FIGS. 7 and 9, distributing channels 169 and 170 which feed the pressurized fluid into branch channels 164 to 168 are constituted in the fluid distributing box 163 by separate chambers which are arranged along mutually parallel planes. To this end, the fluid distributing box 163 includes, in the following succession, a bottom wall 172 having an inlet opening 171 for the cooling fluid, a first housing 173 surrounding the distributing channel 169, a metallic sealing disc 174, a second housing 175 surrounding the distributing channel 170, and a top wall 176. A cutout 177 is provided in the sealing disc 174, and it permits overflow of the pressurized fluid from the distributing channel 169 into the distributing channel 170 in the extent determined by the free flow-through cross-sectional area of the cutout 177. The individual components of the fluid distributing box 163 are held together by screws 178.

As a comparison of FIGS. 4 and 9 will reveal, the pressurized fluid will flow through the inlet opening 171 into the distributing channel 169. A part of this pressurized fluid will flow through the cutout 177 into the distributing channel 170, while the remainder of the fluid stream is split in the distributing channel 169 into partial streams which will enter, as shown in FIG. 9, the branch channels 164, 165 and 166. From the branch channels 164, 165 and 166, the pressurized fluid will flow through bore groups 179 to 182 provided in the second housing 175, and through bore groups 183 to 186 which respectively are aligned therewith and are provided in the top wall 176.

The partial stream of the pressurized fluid which has penetrated through the cutout 177 is subdivided in the distributing channel 170 into partial streams which respectively enter the branch channels 167 and 168 from which they flow to respective bore groups 187 and 188 in the top wall 176. FIG. 4 shows, as an example, one bore of the bore group 188 in a longitudinal section. All of the bore groups 183 to 186, 187, and 188 open onto an opposing surface 189 of the top wall 176. The opposing surface 189 is complementarily configurated to a lower connecting wall 190 of the mold segments 21 in which all inlet openings of the fluid channels 28 to 30 are located, as may be seen in FIG. 2A. A sufficient sealing action between the connecting surface 190 and the opposing surface is achieved solely as a result of the weight of the mold segments 21 which are supported on the opposing surface 189. Thus, once more, an interface for a releasable and screw-free connection of the mold segments 21 within the fluid distributing device is formed at the region of contact of the connecting surface 190 with the opposing surface 189.

A gap 191 assures a radial movability between the mold segment 21 and the fluid distributing box 163 to the extent necessitated by the suspension of the mold segments 21 which is accomplished with a certain amount of play.

FIGS. 6 to 9 show that the individual components of the fluid distributing box 163 are additionally held together by by four screws 192.

As may be seen in FIG. 8, bore groups 193 to 196, which are in registry with the bore groups 179 to 182, are provided in the sealing disc 174.

Figure 10:
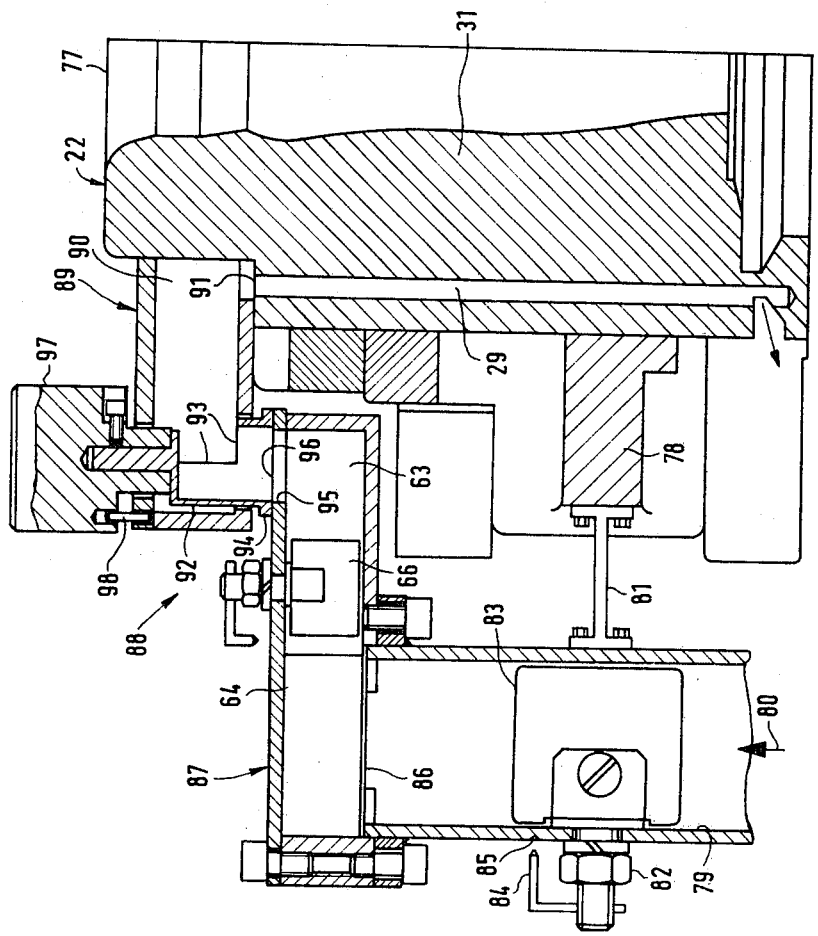
FIG. 10 is a longitudinal sectional view of a modified construction comprising a connecting box mounted on the mold segment.

In a further, modified, construction which is revealed in FIG. 10, a mold segment 77 of a split single parison mold is suspended in a mold segment holder 78 and is pivotable therewith as discussed above in connection with FIG. 1 about a pivoting axle which has been omitted from FIG. 10 for the sake of clarity. The mold segment 77 is provided with groups of axially parallel fluid channels, such as 29, in a manner similar to that discussed above in connection with the description of the mold segments 21.

The supply conduit 79 has a rectangular cross-sectional shape and it receives the cooling pressurized fluid in the direction of an arrow 80, for instance, through a hose which is connected with a cooling air box of the machine frame 3. The supply conduit 79 is attached to the mold segment holder 78 for joint movement therewith by means of a holding device 81. A throttling valve 83, which is adjustable after the loosening of a nut 82, is situated in the supply conduit 79. The throttling position momentarily assumed by the throttling valve 83 can be ascertained by observing the position of an indicator 84 relative to markings 85 provided on an external surface of the supply conduit 79.

The supply conduit 79 communicates at its downstream end with an inlet opening 86 of a fluid distributing box 87 of a fluid distributing device 88.

The fluid distributing box 87 includes three branch channels, of which only the branch channels 63 and 64 are visible in FIG. 10. A connecting box 89 is mounted on the mold segment 77 and it includes, for each of the branch conduits, for instance 63, of the fluid distributing box 87, a connecting channel 90 leading to inlet openings 91 of the fluid channels, for instance 29. Consequently, the cooling fluid flows through the fluid channels, for instance 29, from above to below here. A cup-shaped connecting body 92 is mounted in each connecting channel 90 for movement in the vertical direction. The connecting body has a lateral outlet opening 93 in the connecting channel 90. A free edge portion 94 of the connecting body 92 rests on a complementary opposing surface 96 of the fluid distributing box 87 which surrounds an outlet opening 95 of the associated branch channel 63.

Each connecting body 92 is further provided with a loading body 97 which increases the pressing forces between the free edge portion 94 of the connecting body 92 and the opposing surface 96 of the fluid distributing box 87 in order to improve the sealing action of the surfaces 94 and 96. The loading body 97 is secured against turning with respect to the connecting box 89 by means of a pin 98. Here again, an interface is provided between the free edge portion 94 and the opposing surface 96 for a disassemblable, screw-free connection of the connecting box 89 with the fluid distributing device 88.

FIG. 11 is a circuit diagram of an arrangement in accordance with the present invention, which shows that the pressurized cooling fluid is supplied to the fluid distributing device 99 by the supply conduit 34 which is separated into three distributing channels 100, 101 and 102 which have respective throttling valves 103, 104 and 105 incorporated therein. Each of the distributing channels 100 to 102 feeds the pressurized cooling fluid into two branch channels 106 to 111 each of which is also provided with a throttling valve 112. A connecting box 89 or 113 is connected to the respectively associated mold segment 21 of the double mold illustrated herein, and it includes respective connecting channels 90 and 114 to 117 which are respectively connected by associated cup-shaped connecting bodies 98 and 118 to 121 at a screw-free interface with the branch channels 106 to 111 of a fluid distributing box which has not been shown in detail in FIG. 11 but corresponds to that depicted in FIG. 10.

It will be understood that each of the elements described above, or two or more together, may also find a useful application in other types of arrangements differing from the types described above.

While the invention has been illustrated and described as embodied in a machine for press-and-blow-molding glass articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A distributing arrangement for a pressurized fluid, especially air, for cooling a forming tool of a machine for forming thermoplastic material, especially molten glass, wherein the forming tool includes at least one split mold including mold segments which are respectively mounted on mold segment holders for movement therewith relative to each other and each of which is provided with a plurality of fluid channels for the flow of the pressurized cooling fluid therethrough, comprising a fluid distributing box mounted on each of the mold segment holders for movement therewith and including for each of the mold segments at least two branch channels; means for forming a dismountable common screw-free interface between the fluid channels of the respective mold segment and said branch channels of said fluid distributing box, each of said branch channels communicating across said interface with at least one of the fluid channels of the respective mold segment; and means for supplying the pressurized cooling fluid into said fluid distributing box.

2. The distributing arrangement as defined in claim 1, and further comprising means for detachably mounting said fluid distributing box on the respective mold segment holder.

3. The distributing arrangement as defined in claim 1, wherein said fluid distributing box further includes at least one distributing channel arranged upstream of said branch channels and communicating with the upstream ends of at least two of such branch channels.

4. The distributing arrangement as defined in claim 3, and further comprising a throttling valve in each of said distributing channels.

5. The distributing arrangement as defined in claim 1, and further comprising a throttling valve in each of said branch channels.

6. The distributing arrangement as defined in claim 1, wherein said supplying means includes a supply conduit; and further comprising a throttling valve in said supply conduit.

7. The distributing arrangement as defined in claim 1 for use with mold segment holders each including a holder arm movable in the opening and closing directions of the forming tool and a tilting member tiltably mounted on the holder arm and adapted to support at least two of said mold segments of a multiple mold, wherein said fluid distributing box is mounted on said holder arm for movement therewith.

8. The distributing arrangement as defined in claim 1, wherein said means for forming said interface includes a connecting surface on each of the mold segments onto which the fluid channels open, and an opposing surface on said fluid distributing box juxtaposed with said connecting surface and onto which said branch channels open in alignment with the fluid channels of the mold segment.

9. The distributing arrangement as defined in claim 1, wherein said fluid distributing box includes a plurality of chambers separated from one another and arranged along mutually parallel planes upstream of and in communication with at least two of said branch channels each to constitute respective distributing channels for the associated ones of said branch channels.

10. A distributing arrangement for cooling a forming tool constructed as a double mold of a machine for forming thermoplastic material, especially molten glass, wherein the forming tool includes at least one split mold including mold segments which are respectively mounted on mold segment holders for movement therewith relative to each other and each of which is provided with a plurality of fluid channels for the flow of the pressurized cooling fluid therethrough, comprising a fluid distributing box mounted on each of the mold segment holders for movement therewith, associated with both of the mold segments of the double mold carried by the same mold holder, and including for each of the mold segments at least two branch channels respectively individually communicating with at least one of the fluid channels of the respective mold segment, and a plurality of chambers separated from one another and arranged along mutually parallel planes upstream of and in communication with at least two of said branch channels each to constitute respective distributing channels for the associated ones of said branch channels, a first of said distributing channels communicating with two of said branch channels which, in turn, respectively communicate with the fluid channels in a central circumferential region of each of the mold segments and a second of said distributing channels communicating with further three of said said branch channels which, in turn, respectively communicate with groups of the fluid channels at the remaining circumferential regions of the mold segments; means for forming a dismountable screw-free interface between the fluid channels of the respective mold segment and said branch channels of said fluid distributing box; and means for supplying the pressurized cooling fluid into said fluid distributing box.

11. The distributing arrangement as defined in claim 1, wherein said means for forming said interface includes a connecting box mounted on the respective mold segment, and having a plurality of connecting channels communicating each of said branch conduits with at least one of the fluid conduits.

12. The distributing arrangement as defined in claim 11, wherein said dismountable screw-free interface is formed between said connecting box and said distributing box.

13. A distributing arrangement for a pressurized fluid, especially air, for cooling a forming tool of a machine for forming thermoplastic material, especially molten glass, wherein the forming tool includes at least one split mold including mold segments which are respectively mounted on mold segment holders for movement therewith relative to each other and each of which is provided with a plurality of fluid channels for the flow of the pressurized cooling fluid therethrough, comprising a fluid distributing box mounted on each of the mold segment holders for movement therewith and including for each of the mold segments at least two branch channels respectively individually communicating with at least one of the fluid channels of the respective mold segment; means for forming a dismountable screw-free interface between the fluid channels of the respective mold segment and said branch channels of said fluid distributing box, including a connecting box mounted on the respective mold segment and having a plurality of connecting channels communicating each of said branch channels with at least one of the fluid channels, said dismountable screw-free interface being formed between said connecting box and said distributing box, and said means for forming said interface further including a connecting body movably mounted on said connecting box and forming a hollow space constituting the beginning of the associated connecting channel, said connecting body having a free edge zone forming a connecting surface, and an opposing surface complementary to a connecting surface surrounding the downstream end of the associated branch channel and rested upon by said connecting surface; and means for supplying the pressurized cooling fluid into said fluid distributing box.

14. The distributing arrangement as defined in claim 13, and further comprising means for pressing said connecting surface with a predetermined force against said opposing surface such as to obtain the desired sealing effect, comprising a loading member of a selectable weight resting on said connecting body.

* * * * *